3,376,359
PREPARATION OF DECATRIENES
Wolfgang Schneider, Broadview Heights, Ohio, assignor to The B. F. Goodrich Company, New York, N.Y., a corporation of New York
No Drawing. Filed Sept. 28, 1965, Ser. No. 491,025
5 Claims. (Cl. 260—677)

ABSTRACT OF THE DISCLOSURE

Aliphatic trienes, 1,4,9-decatriene and dimentyl-1,4,9-decatriene, are prepared by reacting ethylene with butadiene or isoprene in the presence of a bisacrylonitrile nickel, bisfumaronitrile nickel, biscinnamonitrile nickel or bisacrolein nickel catalyst. These trienes are useful as third monomers to introduce unsaturation into polymers of ethylene and propylene.

---

This invention relates to a method for preparing aliphatic trienes and relates more particularly to preparation of aliphatic trienes by reacting butadiene or isoprene with ethylene in the presence of a nickel complex catalyst.

1,4,9-decatriene and dimethyl-1,4,9-decatriene are useful as third monomers in introducing unsaturation in polymers of ethylene and propylene. I have now found a novel and inexpensive process for preparing these trienes in good yield by reacting butadiene or isoprene with ethylene in the presence of a bisacrylonitrile nickel, bisfumaronitrile nickel, biscinnamonitrile nickel, or bisacrolein nickel catalyst. This procedure offers many advantages over known methods for preparing these aliphatic trienes. In addition to good yields, the catalyst is inexpensive, does not have to be prepared in situ, can be prepared in advance and stored, and the resulting catalyst reaction product does not contain undesirable impurities which are often found in other catalysts.

The catalysts are readily prepared by refluxing nickel tetracarbonyl with a compound containing activated double bonds as fumaronitrile, cinnamonitrile, acrolein or acrylonitrile, under nitrogen, and isolating the crystalline nickel complex formed by filtration.

In preparing 1,4,9 - decatriene and dimethyl - 1,4,9-decatriene the catalyst may be suspended in dry, oxygen-free butadiene or isoprene and ethylene added in an autoclave. The temperature of the reaction may be between 25 to 250° C. and preferably is between 50 to 150° C. The reaction is conducted under sufficient pressure to dissolve ethylene in the butadiene or isoprene at the temperature of the reaction. The pressure may vary from about 100 p.s.i. to 5000 p.s.i. The amount of catalyst used varies from as low as $10^{-5}$ to 5% or more but large amounts of catalysts are not required. An amount of catalyst from about $10^{-5}$ to 2% based on the amount of butadiene or isoprene and ethylene used is sufficient. While solvents may be used they are not necessary. The following examples demonstrate methods for preparing 1,4,9-decatrienes in accordance with this invention.

Example I 0.85 gram of bisacrylonitrile nickel was added to a 320 ml. autoclave containing 120 grams of dry, oxygen-free butadiene-1,3. 50 grams of ethylene was added to the reactor at room temperature and the reactor heated to 80° C. for 45 hours. At the end of this period the reactor was vented and the reaction product was found to contain 51.5% of 1,4,9-decatriene at a conversion of 98% which is readily purified by distillation to a purity of 99.+%, and about 15% cyclodecadiene.

Example II 0.5 gram of bisacrylonitrile nickel was added to a 320 ml. autoclave containing 94 grams of dry, oxygen-free isoprene. 45 grams of ethylene was charged to the reactor at room temperature and the reactor heated to 80° C. for 45 hours. At the end of this period the reactor was vented and the reaction product was found to contain 85.6% dimethyl-1,4,9-decatriene at a conversion of 99% which is readily purified by distillation. The dimethyl-1,4,9-decatriene contained a mixture of 66.9% 5,8-dimethyl-1,4,9-decatriene and 4,8-dimethyl-1,4,9-decatriene and 18.7% 4,9 - dimethyl - 1,4,9 - decatriene and 5,9-dimethyl-1,4,9-decatriene.

Example III 1.2 gram of bisacrolein nickel was added to a 320 ml. autoclave containing 98 grams of dry, oxygen-free butadiene-1,4. 47 grams of ethylene was charged to the reactor and the reactor heated to 80° C. for 45 hours. At the end of this period the reactor was vented and the reaction product was found to contain 27% of 1,4,9-decatriene at a conversion of 95%.

Example IV 0.8 gram of bisfumaronitrile nickel was added to a 320 ml. autoclave containing 120 grams of dry, oxygen-free butadiene-1,3. 58 grams of ethylene was added to the reactor at room temperature and the reactor heated to 80° C. for 60 hours. At the end of this period the reactor was vented and the reaction product was found to contain 19.5% of 1,4,9-decatriene.

Example V 0.3 gram of bisfumaronitrile nickel was added to a 320 ml. autoclave containing 128 grams of dry, oxygen-free isoprene. 42 grams of ethylene was added to the reactor at room temperature and the reactor heated to 80° C. for 60 hours. At the end of this period the reactor was vented and the reaction product was found to contain 67.3% of dimethyl - 1,4,9-decatrienes. The dimethyl-1,4,9-decatriene contained a mixture of 52.1% of 5,8 - dimethyl - 1,4,9-decatriene and 4,8 - dimethyl - 1,4,9-decatriene and 15.2% of 4,9 - dimethyl - 1,4,9 - decatriene and 5,9-dimethyl-1,4,9-decatriene.

I claim:
1. A method for preparing decatrienes which comprises reacting a compound selected from the group consisting of butadiene and isoprene with ethylene in the presence of catalytic amounts of a nickel compound selected from the group consisting of bisacrylonitrile nickel, bisfumaronitrile nickel, biscinnamonitrile nickel and bisacrolein nickel.

2. A method for preparing 1,4,9-decatriene which comprises reacting butadiene and ethylene at an elevated temperature in the presence of catalytic amounts of a nickel compound selected from the group consisting of bisacrylonitrile nickel, bisfumaronitrile nickel, biscinnamonitrile nickel and bisacrolein nickel.

3. A method for preparing dimethyl-1,4,9-decatrienes which comprises reacting isoprene with ethylene at an elevated temperature in the presence of catalytic amounts of a nickel compound selected from the group consisting of bisacrylonitrile nickel, bisfumaronitrile nickel, biscinnamonitrile nickel and bisacrolein nickel.

4. A method for preparing 1,4,9-decatriene which comprises reacting butadiene with ethylene at a temperature between about 50 to 150° C. under pressure in the presence of about $10^{-5}$ to 2% bisacrylonitrile nickel.

5. A method for preparing dimethyl-1,4,9-decatriene which comprises reacting isoprene with ethylene at a temperature between about 50 to 150° C. under pressure in the presence of about $10^{-5}$ to 2% bisacrylonitrile nickel.

References Cited

UNITED STATES PATENTS 2,972,640   3/1961   Burks _____ 260—666

FOREIGN PATENTS 1,043,143   7/1963   Great Britain.

DELBERT E. GANTZ, *Primary Examiner.*

J. D. MYERS, *Assistant Examiner.*